United States Patent [19]

Kaneko et al.

[11] Patent Number: 4,815,807
[45] Date of Patent: Mar. 28, 1989

[54] COLLIMATOR LENS FOR OPTICAL FIBER

[75] Inventors: Yasuhiro Kaneko, Aichi; Tokihiko Masuzawa, Gifu; Masatoshi Takesue, Aichi; Mitsuo Mori, Tokyo, all of Japan

[73] Assignee: Mitsubishi Rayon Co., Ltd., Tokyo, Japan

[21] Appl. No.: 95,231

[22] Filed: Sep. 11, 1987

[51] Int. Cl.$^4$ .............................................. G12B 6/32
[52] U.S. Cl. ........................... 350/96.18; 350/96.15; 350/96.34
[58] Field of Search ............... 350/96.15, 96.18, 96.29, 350/96.30, 96.34, 451, 452

[56] References Cited

U.S. PATENT DOCUMENTS

| | | | |
|---|---|---|---|
| 4,050,782 | 9/1977 | Uchida et al. | 350/96.18 |
| 4,147,402 | 4/1979 | Chown | 350/96.18 |
| 4,178,066 | 12/1979 | Di Vita | 350/96.18 |
| 4,253,727 | 3/1981 | Jeunhomme et al. | 350/96.18 |
| 4,389,085 | 6/1983 | Mori | 350/96.18 |
| 4,427,284 | 1/1984 | Dannatt | 350/96.18 |
| 4,461,278 | 7/1984 | Mori | 350/96.18 |
| 4,531,810 | 7/1985 | Carlsen | 350/96.20 |
| 4,534,616 | 8/1985 | Bowen et al. | 350/96.20 |
| 4,544,235 | 10/1985 | Nishida et al. | 350/96.34 |

FOREIGN PATENT DOCUMENTS

| | | |
|---|---|---|
| 1947719 | 2/1971 | Fed. Rep. of Germany . |
| 2509054 | 1/1983 | France . |
| 59-038706 | 3/1984 | Japan . |
| 61-035407 | 2/1986 | Japan . |

Primary Examiner—William L. Sikes
Assistant Examiner—Frank González
Attorney, Agent, or Firm—Oblon, Fisher, Spivak, McClelland & Maier

[57] ABSTRACT

A collimator lens for an optical fiber is disclosed. The collimator lens comprises a cylindrical member having an effective radius R and effective axial length L. The cylindrical member is formed of optically transparent material having refractive index $n_1$. The cylindrical member has one circular end portion provided with a connecting portion connectable with a light emitting end face of an optical fiber and the other circular end portion provided with a fresnel lens pattern having a positive focal length F. The focal length F, the effective length L, the effective radius R and the refractive index $n_1$ are satisfied with the following formula (I) and (II);

$$F/L = \tan\{\sin^{-1}(NA/n_1)\}/\tan\{\sin^{-1}(NA)\} \quad (I)$$

$$R \geq L \cdot \tan\{\sin^{-1}(NA/n_1)\} \quad (II)$$

in which NA is numerical aperture of the optical fiber.

4 Claims, 8 Drawing Sheets

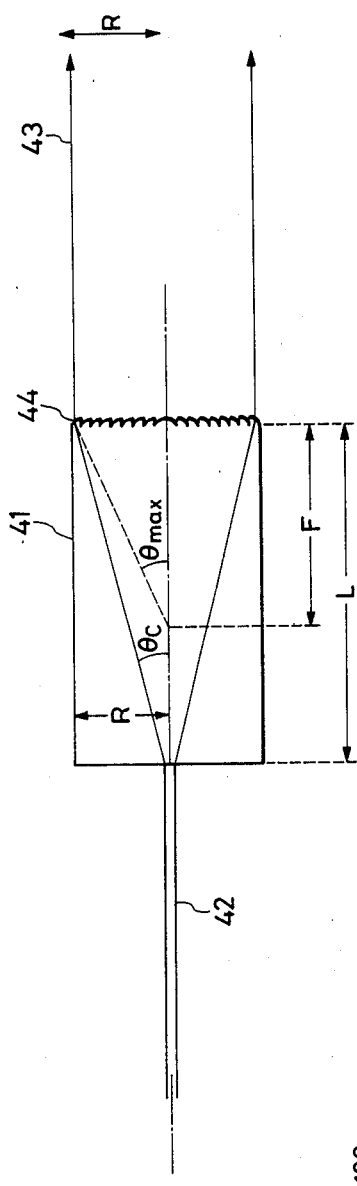
FIG. 4
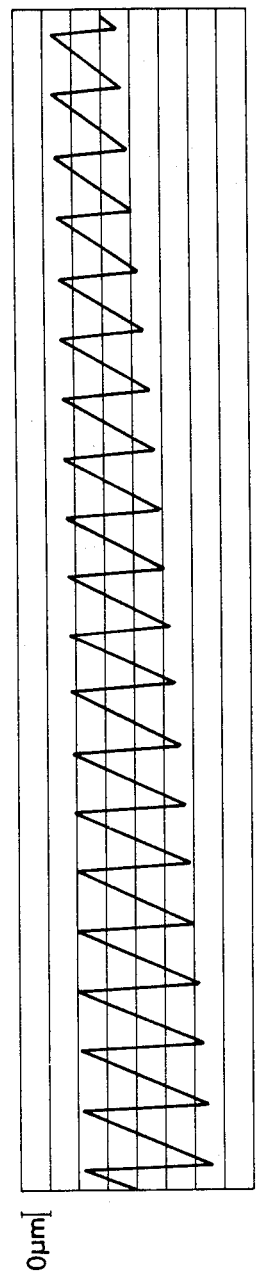
FIG. 5
FIG. 6

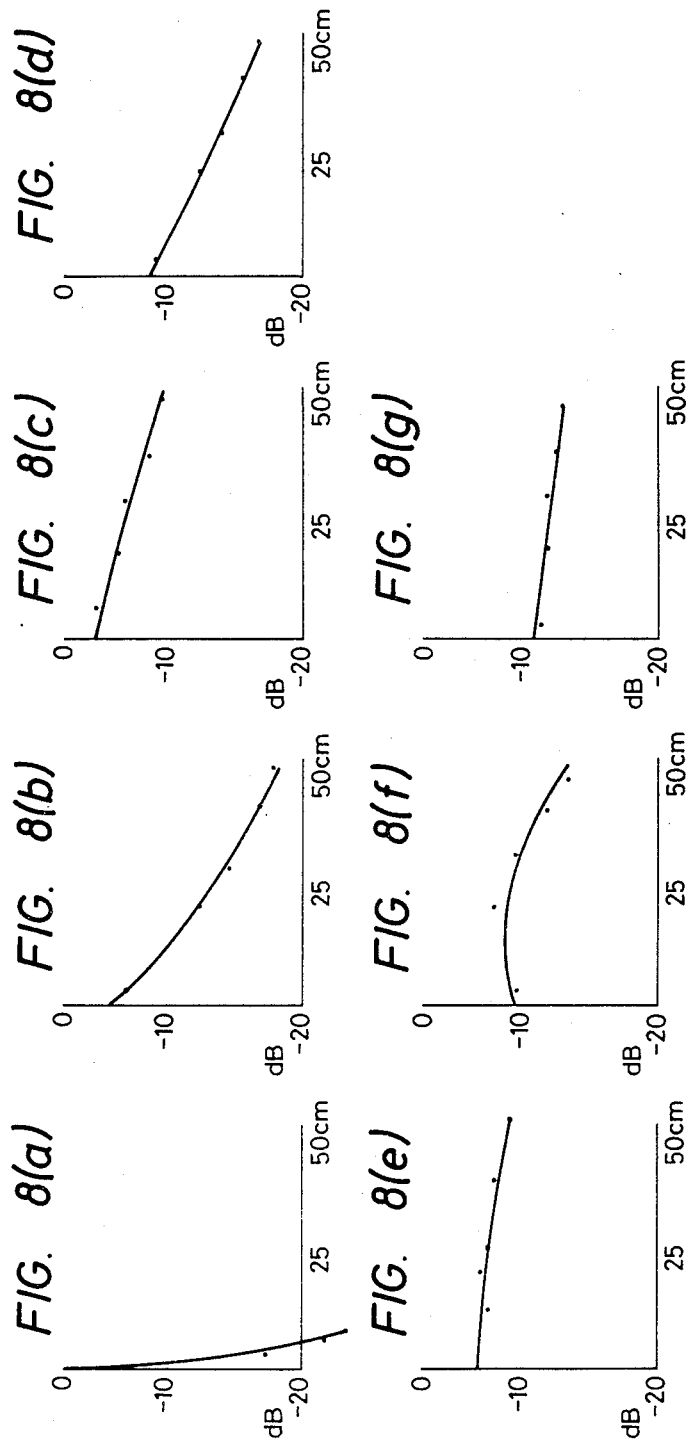

COLLIMATOR LENS FOR OPTICAL FIBER

BACKGROUND OF THE INVENTION

The present invention relates to a collimator lens for an optical fiber, which is adapted to convert divergent lights radiated from a light emitting end face of the optical fiber into a parallel luminous flux.

Utilized as light transmittive optical fiber sensor, light reflective type optical fiber sensor and light bifurcation device are a device including an optical fiber and a collimator lens attached to a light emitting end face of the optical fiber to convert divergent lights radiated from the light emitting end face of the optical fiber into a parallel luminous flux. In the device, the collimator lens is mounted on the light emitting end face of the optical fiber.

According to the collimator lens used in the conventional device, as shown in FIG. 1, a convex lens 22 formed of glass or transparent plastic material is disposed so as to position a light emitting end face of an optical fiber 21 at a focal point 23 of the convex lens 22.

Another type of the conventional device is shown in FIG. 2, wherein a rod lens 32 is disposed which has convergent distribution of refractive index, and a light emitting end face of an optical a fiber 31 is positioned at one end face of the rod lens 32. The latter type is disclosed in Japanese patent application laid open No. 59-38706. In these devices, parallel light 33 is provided at the end of the collimator lens, such as the convex lens 22 and the rod lens 32.

In the collimator for the optical fiber employing the convex lens 22 formed of transparent material such as glass and plastic material as a collimator lens shown in the firstly described conventional device with reference to FIG. 1, it is necessary to provide sufficient efficiency to convert divergent light beam radiated from the optical fiber end into parallel light beam by way of the collimator lens 22. For this purpose, the collimator lens 22 should be a convex lens subjected to highly precise machining. Accordingly, the resultant lens becomes costly. Further, it is also necessary to precisely control an angle of arrangement of the highly processed collimator lens, the position of the focal point thereof, the position of the light emitting end face of the optical fiber, and angular positional relationship therebetween. If these relative arrangements are not precisely provided, it would be impossible to provide parallel light beams.

Further, according to the second type of the conventional optical fiber collimator shown in FIG. 2, wherein employed is the rod lens 32 as a collimator lens having convergent type distribution of refractive index, the rod lens has a diameter not more than about 2 mm, otherwise the rod lens does not provide precise refractive index distribution. Therefore, the second type is not available for wide utility. Moreover, since the rod lens having convergent refractive index distribution has small diameter, high technique is required for axial alignment between the rod lens axis and the light axis at the light emitting end face of the optical fiber. If the axes are offset from each other, it would be impossible to provide precise parallel light, moreover, the conventional rod lens cannot necessarily give enough numerical aperture (NA) to be adapted to the high NA optical fiber such as plastic optical fiber so that the conversion from the divergent light to a parallel luminous flux cannot be performed sufficiently.

SUMMARY OF THE INVENTION

It is therefore, an object of the present invention to overcome the above-described prior art disadvantages and drawbacks and to provide an improved collimator for an optical fiber.

Another object of the present invention is to provide such collimator capable of easily performing axial alignment between a collimator lens axis and an optical axis defined by the light radiation from an end face of an optical fiber.

Still another object of the present invention is to provide the collimator lens which can be easily produced.

In accordance with the present invention, provided is a cylindrical member formed of an optically transparent material, which has refractive index $n_1$, effective radius R, and effective axial length L. The cylindrical member has one circular end provided with Fresnel lens pattern having a focal length F, and the other circular end face provided with a connecting portion connectable with a light emitting end face of an optical fiber. The focal length F, the effective axial length L, the effective radius R and the refractive index $n_1$ are so arranged as to be satisfied with the following formula (I) and (II):

$$F/L = \tan\{\sin^{-1}(NA/n_1)\}/\tan\{\sin^{-1}(NA)\} \quad (I)$$

$$R \geq L \cdot \tan\{\sin^{-1}(NA/n_1)\} \quad (II)$$

in which NA is a numerical aperture of an optical fiber.

BRIEF DESCRIPTION OF THE DRAWINGS

FIG. 4 is an explanatory diagram showing operation of the optical fiber collimator lens according to the present invention;

FIGS. 5 and 6 shown examples of Fresnel lens patterns formed at one end face of the collimator lens according to the present invention;

FIGS. 8(a) through 8(g) are graphical representations showing optical transmission characteristics of collimator lenses which are measured by the apparatus shown in FIG. 7.

DETAILED DESCRIPTION OF THE PREFERRED EMBODIMENTS

Figure 1:
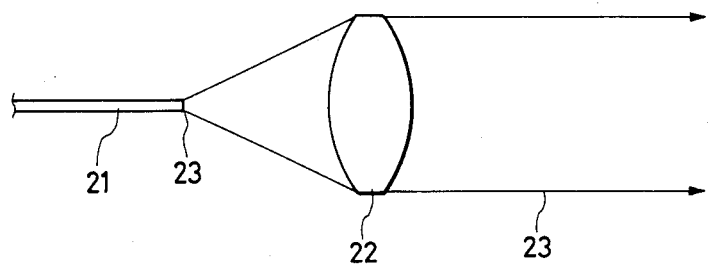
FIG. 1 is a schematic view showing one example of a conventional collimator lens coupled with an optical fiber, and shows a light path passing through the conventional system.
Figure 2:
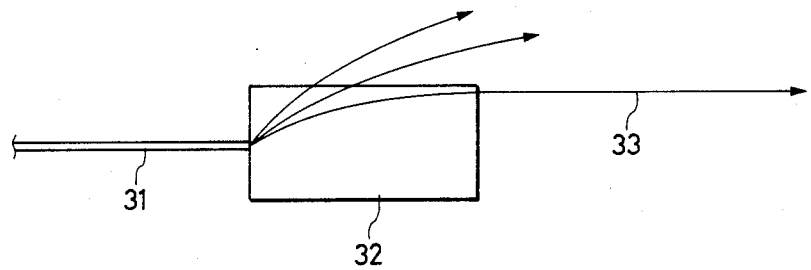
FIG. 2 is a schematic view showing another example of a conventional collimator lens coupled with an optical fiber, and shows a light path passing through the second conventional system.

A collimator lens for an optical fiber according to the present invention will be described with reference to the accompanying drawings.

FIG. 4 is a schematic cross-sectional view showing a collimator lens 41 of the present invention coupled with an optical fiber 42. In FIG. 4, $\theta c$ designates a light spreading angle in which light emitted from a light emitting end face of the optical fiber 42 spreadingly pass through the collimator lens 41. In case the optical fiber has a numerical aperture NA, and the collimator lens is formed of an optically transparent material having refractive index $n_1$, the light spreading angle $\theta c$ meets with the following equation (III):

$$\theta c = \sin^{-1}(NA/n_1) \qquad \text{(III)}$$

In this case, in order to provide parallel luminous flux 43 from the tip end face of the collimator lens the effective axial length L and effective radius R of the collimator lens must be satisfied with the following formula (II):

$$R \geq L \cdot \tan\theta c = L \cdot \tan\{\sin^{-1}(NA/n_1)\} \qquad \text{(II)}$$

If R is smaller than $L \cdot \tan\theta c$, some of the light proceeding through the collimator is reflected on the inside wall before reaching to the end face. Such collimator lens hardly produce parallel luminous flux from the light radiated from the optical fiber. Therefore, the radius R of the collimator lens must be satisfied with the above formula (II).

Further, the collimator lens should have a circular end face 44 formed with a Fresnel lens pattern having a positive focal length F in order to produce parallel luminous flux from the circular end face having an effective radius R, the parallel luminous flux being converted from light propagated through the collimator lens with the spreading angle $\theta c$ from the light emitting end face of the optical fiber.

In this case, as shown in FIG. 4, the following equation (IV) must be satisfied by the focal length F, effective axial length L, and the light spreading angle $\theta \max$, when the light is emitted from the end face of the optical fiber 32 into a cylindrical collimator lens 41 having Fresnel lens pattern and the focal length F.

$$F = L \cdot \tan\theta c / \tan\theta\max \qquad \text{(IV)}$$

In the equation (IV), L designates the effective axial length of the collimator lens. This length is measured from the optical fiber end face disposed at one end of the collimator lens to the other end face thereof provided with the Fresnel lens pattern.

$\theta \max$ can be represented by the following equation (V):

$$\theta\max = \sin^{-1}(NA) \qquad \text{(V)}$$

Therefore, the equation (IV) can be converted into the following equation (VI):

$$F = L \cdot \tan\{\sin^{-1}(NA/n_1)\}/\tan\{\sin^{-1}(NA)\} \qquad \text{(VI)}$$

The optical fiber coupled to the collimator lens according to the present invention and having numerical aperture NA is selected from the group consisting of polymethylmethacrylate core optical fiber having numerical aperture NA of from 0.45 to 0.55, polystylene core optical fiber having NA of from 0.53 to 0.58, polycarbonate core optical fiber having NA of from 0.70 to 0.80, etc.

Further, the collimator lens having refractive index nl according to the present invention is selected from the group consisting of acrylic group resin having refractive index $n_1$ of from 1.47 to 1.50, polystylene group resin having $n_1$ of from 1.50 to 1.58, silicon group resin having $n_1$ of from 1.35 to 1.60 and fluorine group resin having $n_1$ of from 1.30 to 1.42.

When using the collimator lens for optical fiber according to the present invention, the divergent luminous flux emitted from the optical fiber end face can be converted into parallel luminous flux, which can be transmitted through an atmosphere for an increased distance with high directivity.

When the divergent luminous flux emitted from the optical fiber end is converged by means of the convex-shaped collimator lens, the luminous flux is transmitted through, in order, the optical fiber, air, convex-shaped collimator lens, and air, so that Fresnel reflection may be induced upon light passing through each phase boundary. As a result, a several percentages of light amount may be reduced as a loss. However, the boundary area which generates disadvantageous Fresnel reflection can be greatly reduced by using the collimator lens of the present invention and by filling matching oil such as silicone oil into the boundary face between the fiber end and the collimator lens. As a result, obtained is the collimator lens having reduced amount of optical transmission loss.

As described above, the collimator lens for the optical fiber according to the present invention can convert luminous flux radiated from the optical fiber end face into parallel luminous flux which can be effectively transmitted for a long distance with reduced amount of transmission loss. Therefore, the collimator lens of the present invention provides such advantages and is available as devices for optical communication such as an optical bifurcation device and a wave length divider, and other optical elements.

On example according to the present invention will be described.

EXAMPLE

Prepared were three types of optical fibers having NA of 0.5 for optical transmission comprising a core formed of polymethylmethacrylate and a clad formed of fluorine resin. A first fiber had an outer diameter of 1 mm (ESKA EH 4001; Trademark of Mitsubishi Rayon Co., Ltd.), the second fiber had an outer diameter of 500 μm (ESKA EH 2001, Trademark of Mitsubishi Rayon Co., Ltd.), and the third fiber had an outer diameter of 250 μm (ESKA EH 10, Trademark of Mitsubishi Rayon Co., ltd.,). Each of the three optical fibers was subjected to cable processing.

Polymethylmethacrylate having refractive index $n_1$ of 1.492 was used as the raw material of the collimator lens. Two types of collimator lenses were prepared, each having effective radius of 5 mm and 10 mm. Light spreading angle $\theta c$ radiated from the fiber end into the collimator lens was 20 degrees as is apparent from equation (III). Further, from the formula (II), the effective axial lengths L of the two collimator lenses were L=13.74 mm with respect to the lens having the radius of 5 mm, and L=27.48 mm with respect to the lens having the radius of 10 mm. Furthermore, focal lengths F were;

F=8.64 mm for radius 5 mm lens

F=16.93 mm for radius 10 mm lens as is apparent from equation (IV).

Prepared were two cylindrical rods formed of polymethylmethacrlate having radii of 5 mm and 10 mm. Each of end faces of the rods was subjected to machining by numerial control lathe, so that fresnel lenses having focal lengths (F) of 8.64 mm and 16.93 μm were formed. The pitches of the Frensnel lenses pattern were about 100 pm. The Fresnel patterns were measured by needle touching type surface roughness tester, and resultant measuring patterns are shown in FIGS. 5 and 6.

Figure 3:
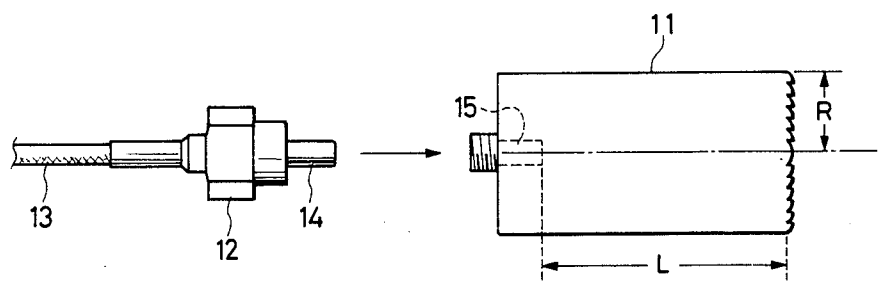
FIG. 3 is a schematic view showing a combination of a collimator lens according to the present invention and an optical fiber assembled thereto.

As shown in FIG. 3, each tip end of the three types of optical fibers 13 was connected with optical fiber connector 12. A tip end portion 14 of each optical fiber was extended from the connector and was inserted into each coupling portion 15 of the collimator lens. A matching liquid of silicone oil for refractive index distribution control was coated over the tip end portion 14 and it was inserted into the coupling portion 15 to thereby provide an optical fiber element coupling with the collimator lens.

Figure 7:
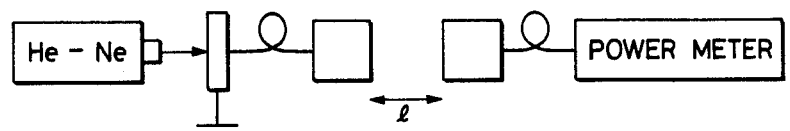
FIG. 7 is a schematic diagram showing an apparatus for measuring a characteristics of an optical fiber collimator lens according to the present invention.

Prepared were two independent optical fiber elements coupled with the collimator lenses. As shown in FIG. 7, free end faces (fresnel lens sides) were confronted with each other and spaced away by a distance l. One optical fiber end of one optical fiber element was connected to a He-Ne laser source, and one optical fiber end of the other optical fiber element was connected to an optical power meter. By changing the distance l, light attenuation amount were measured in the light radiated from the collimator lens face (Fresnel lens side). The results are shown in FIGS. 8(a) to 8(g) and Table 1 below.

Figure 9A:
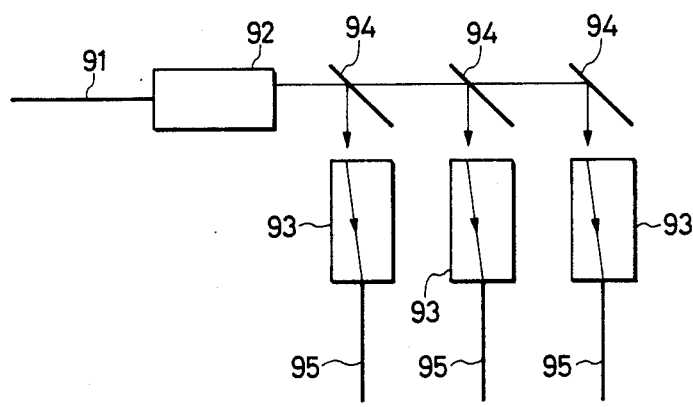
FIGS. 9(a) and 9(b) are schematic views showing light bifurcation devices which use optical fiber collimators according to the present invention.
Figure 9B:
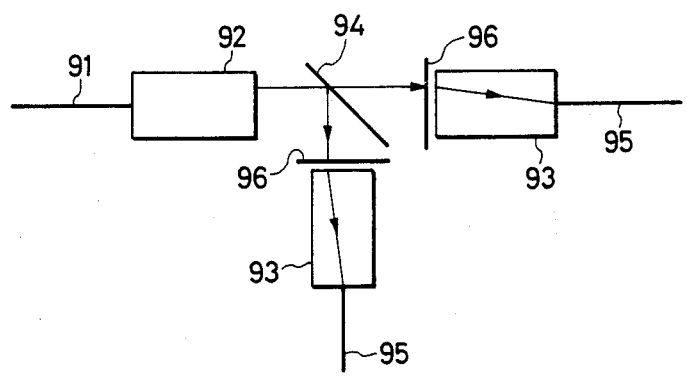

As shown in FIG. 8(a), light transmittable distance was only several cm, if collimator lens according to the present invention was not coupled to the fiber element but optical fiber ends were merely confronted with each other for optical transmission. On the other hand, as shown in FIGS. 8(b) to 8(g), if the optical fiber element is provided with the collimator lens of the present invention, the light transmittable distance became very long exceeding 50 cm. Such optical fiber element provided with the collimator lens was able to be used as light bifurcation devices as shown in FIGS. 9(a) and 9(b). The light bifurcation element includes an optical transmission optical fiber 91, a collimator lens 92 connected to the light emitting end face of the fiber, half mirrors 94, collimator lenses 93 for receiving fiburcated luminous flux, and light receiving optical fibers 95. These collimator lenses 92 and 93 are in accordance with the present invention. If desired, an optical filter 96 may be disposed in front of the collimator 93 of light receiving elements, as shown in FIG. 9(b).

TABLE 1

| Optical Fiber Diameter (μm) | Collimator Lens Effective Radiies (mm) | Effective Length (mm) | Forcal Length (mm) | Fresnal Lens Pattern | Result of measurement of light attenuation amount |
| --- | --- | --- | --- | --- | --- |
| 1000 | 5 | 13.74 | 8.46 | FIG. 5 | FIG. 8(b) |
|  | 10 | 27.84 | 16.93 | FIG. 6 | FIG. 8(c) |
| 500 | 5 | 13.74 | 8.46 | FIG. 5 | FIG. 8(d) |
|  | 10 | 27.84 | 16.93 | FIG. 6 | FIG. 8(e) |
| 250 | 5 | 13.74 | 8.46 | FIG. 5 | FIG. 8(f) |
|  | 10 | 27.48 | 16.93 | FIG. 6 | FIG. 8(g) |
| 1000 | Collimater Lens Non-Use |  |  | — | FIG. 8(a) |

While the invention has been described in detail with reference to specific embodiment thereof, it will be apparent to one skilled in the art that various changes and modification can be made therein without departing from the spirit and scope of the invention.

What is claimed is:

1. A collimator lens for an optical fiber comprising a cylindrical member having an effective radius R and effective length L, said cylindrical member being formed of optically transparent material having refractive index of $n_1$, said cylindrical member having one circular end portion provided with a connecting portion connectable with an optical fiber, and the other circular end portion provided with a Fresnel lens pattern having a positive focal length F, said focal length F, said effective length L, said effective radius R and said refractive index $n_1$ being satisfied with the following formula (I) and (II);

$$F/L = \tan\{\sin^{-1}(NA/n_1)\}/\tan\{\sin^{-1}(NA)\} \quad (I)$$

$$R \geq L \cdot \tan\{\sin^{-1}(NA/n_1)\} \quad (II)$$

ps where NA is numeral aperture of said optical fiber and $n_1$ is greater than 1.3.

2. A collimator lens for an optical fiber as claimed in claim 1, wherein said cylindrical member is formed of a material selected from the group consisting of acrylic resin, polystylenic resin, siliconic resin and fluoric resin.

3. A collimator lens for an optical fiber as claimed in claim 1, wherein said optical fiber has a core formed of a material selected from the group consisting of polymethylmethacrylate, polystylene, and polycarbonate.

4. A collimator lens as claimed in claim 1 further comprising a matching liquid between a light emitting end face of said optical fiber and said connecting portion of said cylindrical member.

* * * * *

UNITED STATES PATENT AND TRADEMARK OFFICE
CERTIFICATE OF CORRECTION

PATENT NO. : 4,815,807

DATED : Mar. 28, 1989

INVENTOR(S): Yasuhiro KANEKO, et al.

It is certified that error appears in the above-identified patent and that said Letters Patent is hereby corrected as shown below:

On the Title page, "8 Drawing Sheets" should be
--4 Drawing Sheets--.

Signed and Sealed this

Twenty-fourth Day of April, 1990

Attest:

HARRY F. MANBECK, JR.

*Attesting Officer*      *Commissioner of Patents and Trademarks*